Jan. 28, 1969    B. D. HALPERN ET AL    3,423,830
PORCELAIN AND RESIN TOOTH WITH SILICON BONDING AGENT
Filed Oct. 1, 1965

INVENTORS
B. DAVID HALPERN
JOHN O. SEMMELMAN

BY *Sherman & Shalloway*

ATTORNEYS

United States Patent Office 3,423,830
Patented Jan. 28, 1969

3,423,830
PORCELAIN AND RESIN TOOTH WITH SILICON BONDING AGENT
Benjamin David Halpern, Jenkintown, and John O. Semmelman, York, Pa., assignors to The Dentists' Supply Company of New York, York, Pa., a corporation of New York
Filed Oct. 1, 1965, Ser. No. 492,070
U.S. Cl. 32—8                                    17 Claims
Int. Cl. A61c *13/08, 13/10;* C03c *25/02*

ABSTRACT OF THE DISCLOSURE

An artificial tooth capable of being strongly and chemically united to a synthetic resin denture base comprising a major proportion of a matrix of dental plastic containing a minor proportion of a dispersion of porcelain particles individually coated with a reactive organic silicon compound. The plastic matrix and porcelain particles are strongly and chemically united by such reactive organic silicon compounds.

---

This invention relates to improved artificial tooth products and more particularly relates to compositions for producing the same.

Artificial teeth have been made from porcelains for approximately 100 years with excellent success and for the past 25 years certain organic or plastic materials have been used for this purpose also. In general, porcelain materials have been slightly harder than needed but plastic materials have been definitely softer and more prone to wear than is optimal for dental purposes. Accordingly, there have been numerous efforts to combine these two materials physically and thereby secure a compromise of the physical characteristics.

For example, various manufacturers have attempted to incorporate small amounts of ceramic powders in their plastic tooth products in an attempt to make them resistant to abrasive wear. Generally these efforts have been unsuccessful as the soft plastic material abraded at its conventional rate and the porcelain grains became exposed and pulled out of the matrix so that they did not effectively retard wear.

Others have manufactured plastic polymers with a ceramic nucleus so that the ceramic would be completely encapsulated and thus might not be loosened and pulled away from the matrix. Such efforts were no more successful than when the ceramic particles had been mechanically intermixed.

In spite of such past failures to combine the dental porcelain and dental plastic so as to produce a compromise of the physical characteristics of the combination, it has now been unexpectedly found that with the application of a specific chemical bonding agent to the porcelain particles, such composite teeth can be prepared.

It is therefore a principal object of the present invention to produce an artificial tooth product having the combined physical properties of dental plastics and dental porcelains.

It is a further object of the present invention to produce an artificial tooth product in which a dental plastic matrix has a dental porcelain as an interstitial filler.

It is yet a further object of the present invention to produce an artificial tooth product in which a dental plastic matrix has a dental porcelain as an interstitial filler, the filler and matrix being strongly united by a reactive organic silicon bonding agent.

Figure 1:
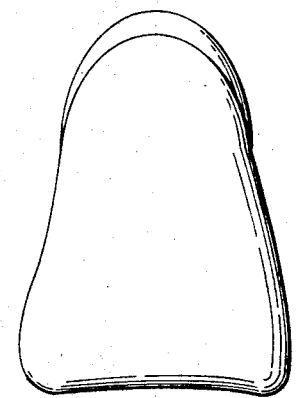
Figure 2:
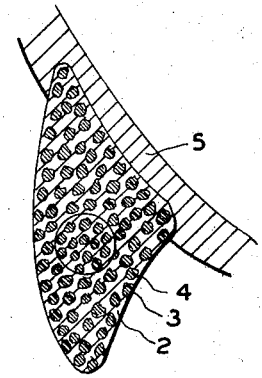

Other and further objects and advantages of the embodiments of this invention will be pointed out hereinafter in the following more detailed description and by reference to the accompanying drawing in which FIG. 1 is a front elevation of an artificial tooth;
FIG. 2 is a labiolingual vertical section showing an artificial tooth of the present invention; and
FIG. 3 is an enlarged view of circled portion of FIG. 2 showing the matrix and filler relationship of the composition of the present invention.

Referring to the drawings, numeral 1 of FIG. 1 designates the completed artificial tooth as viewed from the front.

Figure 3:
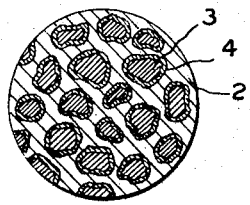

With respect to the composition of the tooth itself, reference is drawn to FIG. 3, which figure is an enlarged view of the encircled area of FIG. 2. The numerals set forth in FIG. 3 correspond to those also shown in FIG. 2.

The matrix material 2 may be any conventionally known dental plastic material. These include the polyacrylates, polymethacrylates such as methyl polymethacrylate, ethyl polymethacrylate, etc., polyamides, polystyrenes, epoxies, polyesters, and vinyl resins, such as Luxene, a copolymer of vinyl chloride and vinyl acetate. It is only necessary that these materials possess the structural rigidity necessary for the production of a plastic dental product and contain a monomer capable of co-polymerizing or be otherwise capable of reacting with the reactive organic silicon coating 4. It should be noted at this time that the thickness of the silicon coating 4 is exaggerated for emphasis for, in actual industrial application, only a thickness of a few molecules need be employed to produce an adequate bonding.

The interstitial porcelain filler 3 similarly may be any conventionally known dental porcelain or even certain commercial glasses. Such dental porcelains include the feldspathic porcelains derived from orthoclase, the nepheline syenite forms naturally occurring as oxides of potassia, soda, alumina and silica, synthetic porcelains prepared from synthetic glasses and the so-called alumina-base porcelains, providing an abundance of aluminol groups as well as silanol groups on the surface thereof, derived from natural mineral-steatite or talc, etc.

The organic silicon chemical bonding agent is represented by numeral 4. Again, it is to be emphasized that the bonding thickness is exaggerated in that a chemical coating of only a few molecules in thickness is required.

We have found that a synergistic type of property is imparted by a silicon compound used as a bonding agent when the same contains a first functional group reactable with either of the aluminol or silanol groups which lie under and on the surface of the porcelain filler particles 3. This bonding agent also contains another functional group which is reactable chemically in some manner, as by copolymerization, with the synthetic plastic of the matrix 2. The chemical bonds formed between the bonding agent and the two substrates thus provide a dual effect by creating both conventional adhesion and chemical reaction cementing to unite both substrates permanently.

The bonding agents found and disclosed herein to be suitable in achieving this type of chemical bonding with either the aluminol or silanol groups, or both, or their precursors, aloxane or siloxane, and lying at the surface of the porcelain teeth, contain functional groups which are reactable with the metal hydroxyl groups. These form strong adhesive chemical bonds therewith. Similarly, other and different functional groups are attached directly to the silicon and are chosen so as to be reactable with the particular synthetic resin forming the tooth matrix.

The silicon compounds which may be reacted with the aforementioned substrates are of the generic formulae $RSiX_3$, $R_2SiX_2$ and $R_3SiX$ in which X is selected from the halogen, alkoxy and hydroxyl groups, and other groups reactable with silanol, and wherein R is selected from the vinyl, methacrylate, allyl, methallyl, itaconate, maleate, acrylate, aconitate, fumarate, alkyl, aryl, alkenyl, crotonate, cinnamate and citraconate, sorbate and glycidyl groups, examples of which compounds may be utilized include the following: vinyl dimethyl chlorosilane, vinyl dimethyl methoxysilane, divinyl chloromethyl silane, vinyl trichlorosilane, vinyl dichloromethyl silane, 3-(trimethoxysilyl)propyl methacrylate or cinnamate,
3-(glycidoxypropyl)trimethoxy silane,
bisglycidoxypropyl dimethoxysilane,
trimethoxy vinyl silane,
tri(methoxyethoxy)vinyl silane,
triethoxyvinyl silane,
vinyl silyl triacetate,
gamma-methacryloxypropyl trimethoxysilane,
trimethoxyallyl silane,
diallyl diethoxysilane,
allyl triethoxysilane,
3-(methoxydimethyl silyl)propyl allyl fumarate,
3-(chlorodimethyl silyl)propyl methacrylate and either the
3-(trimethoxysilyl)propyl allyl maleate,
fumarate,
itaconate or sorbates,
vinyl-tris(beta-methoxyethoxy)silane,
beta-(3,4-epoxycyclohexyl)ethyl triethoxysilane,
diphenyl diethoxysilane,
amyl triethoxysilane, and
acrylato-tris(methoxysilane).

Instead of using the simple silane or disiloxane derivatives listed above, we may also use appropriately substituted polysiloxanes. Depending on the nature of this polysiloxane, the adhesive bond may have some elastomeric character.

The unusual result achieved with the alkoxy silanes is explainable by considering the chemical mechanism accompanying the total reaction. Intermediate to the final reaction, the water hydrolyzes the alkoxy group and removes same from the silane to replace it with an hydroxyl group. This modified intermediate bonding agent, containing an hydroxyl group and taking on the form of a silanol, is reactable directly with the other silanol group lying at the surface of the substrate. The water may also react with siloxane groups on the surface of the porcelain and convert them to more principally reactive silanol forms. It has been found, however, that a suitable bonding will result on a dry surface also.

Although we have thus far indicated that only the silanes which are monofunctional are suitable, it is obvious that the number of groups on the silane which are reactable with the porcelain may be one, two or three in number. The spirit of our invention is in no way changed when, for example, a bonding agent comprising vinyl trichlorosilane, vinyl dichloromethylsilane or vinyl dimethylchlorosilane is used. We may, similarly, use a mono, di or trialkoxysilane. The use of a silane having multiple functionality, such as vinyl trichlorosilane, or an acrylate trialkoxysilane, serves ostensibly to increase the number of covalent bonds between the silane and the porcelain surface and hence increases the overall interfacial adhesion therebetween. We may likewise have multiple unsaturate functionality which will serve to increase the number of covalent bonds between the silane bonding agent and the plastic matrix.

Notwithstanding the particular type of synthetic resin forming the tooth matrix, a functional group which is reactable therewith is selected to form a part of the bonding agent. It is theorized that the type of chemical bond formed between the bonding agent and substrates is of the covalent variety formed by condensation, copolymerization, graft polymerization, chain transfer or there may yet be other and different modes of covalent attachment. Ionic bonding, Van der Waals bonding and hydrogen bonding may also contribute to the character of our adhesive bonds.

The compound 3 - glycidoxy - propyl trimethoxysilane is exemplary of the variety and types of reactive groups which will polymerize onto and with a methacrylate-type resin matrix. Although the bond strength obtained when using this particular compound is very good, the mechanism involved in the reaction between the substrates remains somewhat of a mystery. Such is particularly the case as between the oxirane group and the ensuing free radical reaction which apparently results in the formation of an actual polymeric change between the reactants.

Although the exact type of reactive mechanism and the kinetics of the epoxy group with other growing polymers is not yet clear, we have found epoxy silanes particularly satisfactory with many of the other synthetic resins which may be used for the tooth matrix. More specifically, when an epoxy compound is used instead of the methacrylate monomer and polymer of the tooth matrix, an epoxy silane bonds readily to it so as to not exhibit cohesive failure under acceptable test conditions. It is therefore obvious that the oxirane group can readily react with other oxirane groups such as found in epoxy resin precursors. We have also advantageously used unsaturated epoxy monomers such as glycidyl methacrylate as partial replacement for the methyl methacrylate monomer. We may also incorporate the glycidyl methacrylate into the polymer by copolymerization. In each case, the epoxy-containing polymer was found to be an integral part of the finished composition.

Numeral 5 of FIG. 2 represents the denture base. This material may be any conventionally known synthetic resin denture base material capable of producing a strong bonding to the plastic matrix of the composite tooth. Such bonding can be the result of copolymerization or other chemical reaction or a physical diffusion of the two materials. In general, those materials suitable for employment as the tooth matrix may also be employed as the denture base.

While FIG. 2 has been shown as an artificial composite tooth which contains a simple core structure, an undercut or diatoric core structure can be employed to enhance the physical connection of the tooth matrix and denture base and supplement the chemical union. Such undercut or diatoric structures are within the scope of the present invention.

The plastic matrix forming a major proportion of the tooth structure of the present invention, corresponds in general to about 50% to about 99%, e.g., a major proportion by weight, of the final composition while the porcelain filler may be employed in a minor amount corresponding to from 1% to about 50%, e.g., a minor proportion by weight, of the final composition. An amount of powdered ceramic corresponding to about 3% by weight of the composition is preferably employed. The silicon bonding agent need only be employed in an amount sufficient to produce a coating of a few molecules in thickness on the surface of the porcelain filler. In general, an amount corresponding to about .01% to about 1.5% of the total composition need be used.

The composite artificial teeth of the present invention are generally prepared as follows:

A conventional dental porcelain is ground by conventional techniques to grain sizes generally between 100 and 400 mesh. Admixtures of coarse grains have been found to give equal or better physical properties than fine grain sizes and they are limited in their use only by the sandy, grainy or gritty appearance which they impart to the finished article. A preferred particle size is 130–200 mesh, although the addition of surface bonding agents reduces adverse effects such as blanching and permits the use of somewhat finer porcelain particle sizes with attendant improvement in the esthetic effect.

The ground porcelain powders are hydrolyzed and immersed in a suitable silicon bonding agent solution. The particles are agitated to insure complete coverage and thereafter dried to remove excess diluent.

The coated porcelain particles are thereafter mixed with and dispersed in a prepared plastic composition. It is preferred that the particles be dispersed in a gelled system of monomer and polymer but such particles may also be dispersed in either a plastic moulding material consisting only of dry polymer or consisting only of the liquid monomeric phases. The silicon coupling agent would unite equally well with either in the final polymerization reaction and the ceramic would become an integral part of the finished, moulded article.

The polymer system may be pigmented as desired and necessary for dental prosthetic appliances by the admixture of inorganic oxide pigments to the solid polymer phase or by dissolution of organic dyes into the liquid monomeric phase.

The plastic system having dispersed particles of porcelain therein is then moulded and cured over a period of time under heat and pressure. Usually, special curing catalysts or accelerators are not necessary as the system is generally capable of final curing under the influence of heat and pressure; however, such conventional additives may be used without deviating from the concept of the present invention.

After final curing, the hardened mass is removed from the mould and mechanically finished to remove any seams or surface roughness.

As an alternative process, the bonding agent may be added to the liquid plastic phase and the porcelain particles mixed with the plastic polymer. These two phases are then mixed and gelled with polymerization of the plastic.

The following examples illustrate the preparation of the embodiments of the present invention:

*Example I*

Conventional dental porcelain consisting of a feldspathic glass base, possibly modified with silica oxide for thermal or mechanical strength properties, is used. Such porcelains may be fluxed or lowered in their fusing temperature by the addition of boric oxide to result in easier manufacturing. These porcelain powders are ground by conventional techniques to grain sizes between 130 and 200 mesh, and are hydrolyzed by exposure to boiling water for approximately one hour.

Porcelain powders described above are immersed in a solution of 3% trimethoxysilyl propyl methacrylate in hexane, modified with 0.2% acetic acid. After agitation has insured thorough wetting, the excess liquid is decanted and the remaining porcelain particles are dried with agitation to ensure uniform thicknesses of the silane remaining on all surfaces. Porcelain powders are then heated in a circulated air oven to ensure complete volatilization of the hexane diluent.

Meanwhile, a plastic formulation is produced consisting of approximately 67% by weight methyl methacrylate polymer and 33% by weight methyl methacrylate monomer containing a minor proportion of a cross-linker such as divinyl benzene. The solid and liquid phases of the methacrylate materials start to form a gel or a viscous mass promptly upon being intermixed. About 10% by weight of the coated ceramic phase is introduced at the beginning of this operation so that it may be thoroughly dispersed while the mixture is still liquid. Agitation is continued as the methacrylate suspension thickens to a gel state capable of supporting the dense ceramic particles and preventing them from settling to the bottom of the mixture under the influence of gravity.

The gelatinous methacrylate material containing the coated ceramic particles is stored under refrigeration until it achieves a stiff rubber consistency which renders moulding and curing easy. The material is then placed in the mould.

The methacrylate gel containing dispersed coated porcelain is cured in the metal mould by heating to a temperature of approximately 270° F. on an abbreviated cycle allowing 5 minutes for heating and 5 additional minutes for cooling back to room temperature.

The final cured product is then mechanically finished to remove mould seams and rough surface areas.

Alternatively, the curing cycle could have been conducted at temperatures down to 165° F., although the time required for completion of the cure would have to be increased to as much as 5 hours. Also, no external heat would be required if a suitable amine accelerator and benzoyl peroxide catalyst had been incorporated in the plastic formula. In the case of such auto-curing materials, sufficient free radicals are formed within a period of approximately 15 minutes to essentially complete the cure.

The material produced by this process is found to have the following composition: cross-linked polymethyl methacrylate 90% (including the copolymerized silane bond), ceramic 10%.

When the tooth product is tested with conventional equipment, it is found that there is considerably less tendency of the plastic-containing inclusions of porcelain to abrade. It is also found that polishing of the denture by a laboratory technician can proceed without fear of polishing destroying the anatomy of the composite tooth set therein.

*Example II*

A similar product is prepared as that shown in Example I except that a mixture of 1% dimethyl vinyl chlorosilane in 99% hexane is employed as the chemical bonding agent. A product of the following composition is produced: cross-linked methyl polymethacrylate 90% (including the copolymerized silane bond), ceramic 10%.

Here again, the composite tooth showed no tendency to abrade and no loss of the porcelain as by falling out is detected.

*Example III*

The procedure of Example I is repeated except that a 2% hexane solution of vinyl dimethyl silanol acidified by the addition of 0.1% acetic acid is employed as the chemical bonding agent. A product similar to those of Examples I and II is produced.

*Example IV*

This example illustrates an alternate process for producing the composite teeth of the present invention.

Commercial glass beads are exposed to a steam environment in order to effect hydrolysis of the silica molecules in their surface layer. They are subsequently thoroughly dried so as to remove surplus moisture and leave only a monomolecular layer of the hydroxyl ions needed for bonding to the silane material.

A plastic material is prepared by using a vinyl chloride-vinyl acetate copolymer and adding three parts by weight of the dried glass particles to 65 parts by weight of the vinyl copolymer. This mixture is augmented with ¼% benzoyl peroxide catalyst, and pigments—titanium dioxide, lamp black, and raw earth colors such as ochre, sienna, and umber. Meanwhile, a liquid phase is prepared consisting of 30 parts by weight of methyl methacylate monomer, 2 parts of ethylene dimethacrylate cross-linking agent, and 1 part of trimethoxysilyl propyl methacrylate. The composite powder phase is mixed with the composite liquid phase and mixing continued until a stiff gel is formed capable of supporting the glass particles which are added in an amount equal to 20% of the plastic. The glass does not segregate under the influence of gravity due to high viscosity of the mixture.

At this stage the gelatinous mass is transferred into metal moulds simulating the forms of artificial teeth and there, under the influence of pressure and heat, as in Example I, the mass is polymerized into a hard and shaped article capable of withstanding the stresses to which dental plastics are usually subjected but additionally capable of increased resistance to abrasion, grinding, or wear as a result of the chemically united ceramic constituent.

The artificial tooth product so provided is found to have the following composition: cross-linked resin composition 80% (including the silane coupling agent), glass beads 20%. The vinyl resin is physically or even chemically interacted by chain transfer with the methyl polymethacrylate and cross-linking monomer so that the whole resin composition is in effect cross-linked.

While certain desirable embodiments of the invention have been illustrated by way of example, it is to be understood that the invention is not limited to these embodiments but is to be regarded as broadly as any and all equivalent structures and composition.

We claim:

1. A complete artificial tooth consisting essentially of a major proportion of a matrix of dental plastic containing a minor proportion of a dispersion of porcelain particles individually coated with a reactive organic silicon compounds, said plastic matrix and porcelain particles being chemically and strongly united by said reactive organic silicon compound.

2. The artificial tooth of claim 1 wherein the porcelain particles are from 100 to 400 mesh in size.

3. The artificial tooth of claim 1 wherein the reactive organic silicon compound is selected from the group consisting of compounds of the formulae $RSiX_3$, $R_2SiX_2$ and $R_3SiX$ wherein R is a radical selected from the group consisting of vinyl, methacrylate, allyl, methallyl, itaconate, maleate, acrylate, acronitate, fumarate, alkyl, aryl, alkenyl, crotonate, cinnamate, citraconate, sorbate and glycidyl groups and X is selected from the group consisting of halogen, alkoxy and hydroxy groups.

4. The artificial tooth of claim 3 wherein the reactive organic silicon compound is trimethoxysilyl propyl methacrylate.

5. The artificial tooth of claim 3 wherein the reactive organic silicon compound is dimethyl vinyl chlorosilane.

6. The artificial tooth of claim 3 wherein the reactive organic silicon compound is vinyl dimethyl silanol.

7. A complete artificial tooth product comprising a matrix of dental plastic containing a dispersion of porcelain particles individually coated with a reactive organic silicon compound, said plastic matrix being chemically and strongly united by said reactive organic silicon compound wherein said platsic matrix comprises from a minimum of 50% to about 99% by weight of the composition, the dispersed porcelain particles comprises from about 1% to about 50% by weight of the composition and the organic silicon compound is employed in an amount corresponding to from about 0.01% to about 1.5% by weight of the final composition.

8. The artificial tooth of claim 7 wherein the porcelain particles are from 100 to 400 mesh in size.

9. The artificial tooth of claim 7 wherein the reactive organic silicon compound is selected from the group consisting of compounds of the formulae $RSiX_3$, $R_2SiX_2$, and $R_3SiX$ wherein R is a radical selected from the group consisting of vinyl, methacrylate allyl, methallyl, itaconate, maleate, acrylate, acronitate, fumarate, alkyl, aryl, alkenyl crotonate, cinnamate, citraconate, sorbate and glycidyl groups and X is selected from the group consisting of halogen, alkoxy, and hydroxy groups.

10. The complete artificial tooth of claim 1 wherein said matrix of dental plastic comprises a matrix of methacrylate-type plastic.

11. The artificial tooth of claim 10 wherein the methacrylate-type plastic matrix comprises from a minimum of 50% to about 99% of the composition, the dispersed porcelain particles comprise from about 1% to about 50% of the composition and the organic silicon compound is employed in an amount corresponding to from about .01% to about 1.5% of the final composition.

12. The artificial tooth of claim 11 wherein the porcelain particles are from 100 to 400 mesh in size.

13. The artificial tooth of claim 11 wherein the methacrylate-type plastic is polymerized methyl methacrylate.

14. The artificial tooth of claim 11 wherein the reactive organic silicon compound is selected from the group consisting of compounds of the formulae $RSiX_3$, $R_2SiX_2$, and $R_3SiX$ wherein R is a radical selected from the group consisting of vinyl, methacrylate, allyl, methallyl, itaconate, maleate, acrylate, aconitate, fumarate alkyl, aryl, alkenyl, crotonate, cinnamate, citraconate, sorbate and glycidyl groups and X is selected from the group consisting of halogen, alkoxy and hydroxy groups.

15. The artificial tooth of claim 14 wherein the reactive organic silicon compound is trimethoxysilyl propyl methacrylate.

16. The artificial tooth of claim 14 wherein the reactive organic silicon compound is dimethyl vinyl chlorsilane.

17. The artificial tooth of claim 14 wherein the reactive organic silicon compound is vinyl dimethyl silanol.

References Cited

UNITED STATES PATENTS

| | | | |
|---|---|---|---|
| 2,463,549 | 3/1949 | Myerson | 32—8 |
| 2,611,958 | 9/1952 | Semmelman | 32—8 |
| 3,052,583 | 9/1962 | Carlstrom et al. | 161—206 X |
| 3,288,893 | 11/1966 | Stebleton | 161—208 X |

FOREIGN PATENTS 890,731  3/1962  Great Britain.

F. BARRY SHAY, *Primary Examiner.*

U.S. Cl. X.R.

117—123, 72; 161—162, 208